United States Patent Office 3,477,790
Patented Nov. 11, 1969

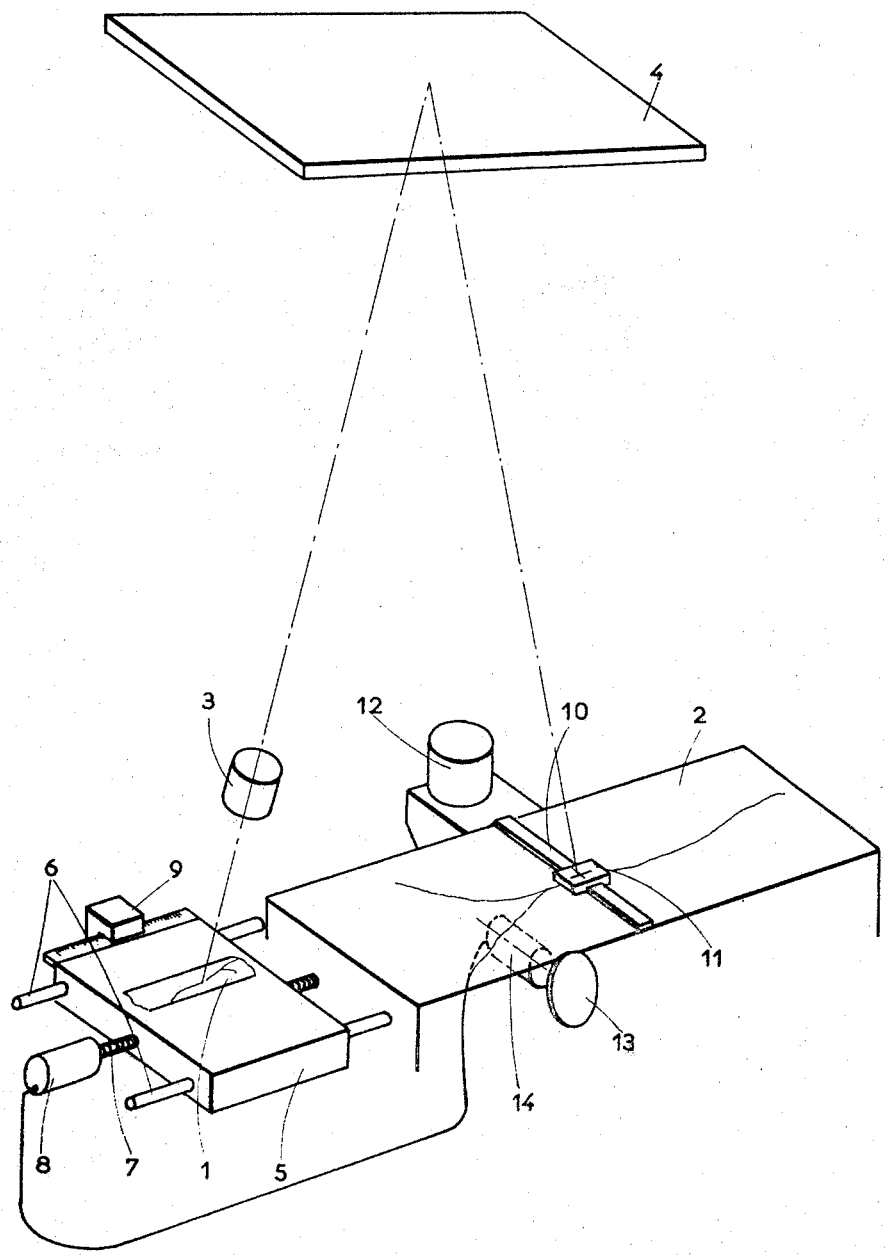

3,477,790
APPARATUS FOR MEASURING COORDINATES OF POINTS
Jean Pierre Baton, L'Hay-les-Roses, and Helenio Llop, Creteil, France, assignors to Societe d'Optique, Precision, Electronique et Mecanique, Paris, France, a company of France
Filed July 26, 1966, Ser. No. 568,004
Claims priority, application France, Aug. 5, 1965, 27,307
Int. Cl. G01b 9/08
U.S. Cl. 356—164     3 Claims The invention relates to an apparatus for measuring the coordinates of points in a curve optically projected into a table or onto a large screen.

Apparatus exists for measuring coordinates of projected curves by moving an index mark along the projection of the curve. This method has the advantage of being direct, but requires the operator to move when the projection of the curve is too big.

The apparatus constructed according to the invention overcomes this disadvantage and allows the operator to make measurements without leaving his post.

According to the invention, the apparatus includes a carriage movable in a straight line and carrying the curve, an optical system projecting the curve onto the fixed table, a plate movable on the table in a direction perpendicular to the movement of the projection of the curve during movements of the carriage, and means for measuring the movements of the carriage and plate.

The invention will now be described in greater detail with reference to a particular embodiment given by way of example and shown in the accompanying drawing. This description will reveal supplementary features of the invention. This drawing is a diagrammatic perspective view of apparatus constructed according to the invention.

The apparatus shown in the drawing allows projection of a slide or view 1 on to a table or screen 2 by means of a lens 3 and reflector 4.

The view 1, for example a strip long relative to its width, is attached to a carriage 5 sliding along rails 6. The carriage 5 may be moved by means of a screw 7 engaged in a matching thread in the carriage, the screw being actuated by a synchro-receiver 8. A measuring device 9 reads the movements of the carriage 5 by coding or counting pulses.

A small scale 10 is fixed transversely on the table 2, for example in the middle of this table, and acts as guide means for a small plate 11 bearing an index mark. This plate 11 entrains—for example by means of wires, belts or pinions—measuring means 12 which read the transverse movements of the small plate 11 by coding or counting pulses.

An operating knob 13 at the edge of the table 2 or on a desk actuates a synchro-transmitter 14 electrically connected to the synchro-receiver 8. By turning the knob 13 the operator moves the carriage 5 and therefore the slide 1, so that the projection of the slide on the table 2 moves across in front of the operator. He can therefore make a marking on one part of the projection by bringing the index mark to coincide with it, by moving the plate 11 across on the scale 10 and by shifting the projection of the slide across by means of the knob 13.

When the reference has been taken, the operator can record the information contained in the scanners 9, 12, reading the two coordinates X and Y of the point measured. Reading may be done by suitable means by pressing a pedal or a recording button.

The apparatus just described enables an operator to measure the coordinates without moving himself even if the slide projected is very long.

Obviously, the invention is not restricted by the details of the embodiment described.

For example, other control means may be provided for moving the carriage 5 in order to move the projection of the slide 1 along the table 2. For instance, a motor control may be used.

The means for scanning the movement of the carriage may be different, for example they may be rotary and connected to the screw 7 controlling the carriage 5.

The projection means may be different. For example the slide may be projected directly onto a transparent screen or table.

Whatever the length of the image projected on the table 2, the taking of references is always easy since it consists in moving a very light plate 11 along a fixed scale 10 and over a generally short path. Hence references can be taken in a direct manner on the image projected.

Another advantage of the apparatus is that the scale 10 is fixed in the centre of the field of the projection system. Measuring can therefore be done on a constant zone of this optical system and on a field small compared with the total field of the projection. The residual aberrations of the lens or reflector are therefore slight and constant for the various points in the projection.

We claim:
1. Apparatus for measuring the coordinates of points in a curve optically projected onto an elongated table, including a carriage movable in a straight line parallel to the length of the table and carrying the curve with the length of the curve parallel to the length of the table, means including a synchro-receiver receiving instructions from a synchro-transmitter situated beside the table controlling the movement of the carriage, an optical system projecting the curve onto the table at a fixed location whereby the projected curve traverses said fixed location as the carriage moves, a plate at said fixed location movable on the table in a direction perpendicular to the movement of the projection of the curve during movements of the carriage, and means responsive to the movements of the carriage and plate for measuring said movements.

2. Apparatus as set forth in claim 1, including guide means whereby the carriage moves parallel to the table.

3. Apparatus as set forth in claim 1, including means for rectilinearly guiding the movements of the plate on the table.

References Cited

UNITED STATES PATENTS

| | | |
|---|---|---|
| 2,484,103 | 10/1949 | Lewis. |
| 2,498,030 | 2/1950 | Davis. |
| 2,592,264 | 4/1952 | Fultz. |
| 2,718,813 | 9/1955 | Leininger. |
| 3,024,696 | 3/1962 | Bomzer. |
| 3,254,560 | 6/1966 | Gottesmann. |

JEWELL H. PEDERSEN, Primary Examiner
T. MAJOR, Assistant Examiner